Oct. 5, 1943.                J. D. RYDER                 2,331,138
                         MEASURING APPARATUS
                       Filed Jan. 23, 1942           5 Sheets-Sheet 1

Inventor
JOHN D. RYDER
By Raymond D. Junkins
Attorney

JOHN D. RYDER

Oct. 5, 1943.        J. D. RYDER        2,331,138
MEASURING APPARATUS
Filed Jan. 23, 1942        5 Sheets-Sheet 4

FIG. 5

Inventor
JOHN D. RYDER
By Raymond W. Junkins
Attorney

Oct. 5, 1943.   J. D. RYDER   2,331,138
MEASURING APPARATUS
Filed Jan. 23, 1942   5 Sheets-Sheet 5

FIG. 6

Inventor
JOHN D. RYDER
By Raymond D. Junkins
Attorney

Patented Oct. 5, 1943

2,331,138

UNITED STATES PATENT OFFICE 2,331,138

MEASURING APPARATUS

John D. Ryder, Ames, Iowa, assignor to Bailey Meter Company, a corporation of Delaware Original application September 13, 1939, Serial No. 294,570. Divided and this application January 23, 1942, Serial No. 427,846

8 Claims. (Cl. 171—95)

This invention relates to measuring apparatus and forms a continuation-in-part of my application Serial No. 77,488 filed May 2, 1936, now Patent 2,215,254, as well as being a division of my copending application Serial No. 294,570, filed September 13, 1939, as a continuation-in-part of my application Serial No. 77,488. More particularly this invention relates to electrical measuring apparatus of the potentiometric type wherein a potential generated in correspondence with the magnitude of a condition is balanced against a known variable voltage produced by a potentiometer so that the latter becomes a measure of the former. Apparatus of this general type is particularly adapted to the measurement of temperature, a thermocouple being used to produce a potential varying as the temperature to be measured.

In the conventional potentiometer pyrometer the portion of the slide wire resistance of the potentiometer in circuit with the thermocouple is automatically varied so that the potential generated by the thermocouple is opposed by an equal and opposite potential. An unbalance between the thermocouple and slide wire potential is detected by means of a galvanometer connected in circuit with the thermocouple. A deflecting member of the galvanometer is used to control a suitable reversing means, such as an electric motor which positions a contact along the slide wire and varies the portion of the slide wire in circuit with the thermocouple to restore the said potentials to equality and return the deflecting member of the galvanometer to predetermined null or zero position. The portion of the slide wire in circuit with the thermocouple is then a measure of the thermocouple potential, and inferentially of the temperature to which the thermocouple is responsive.

As a galvanometer is extremely delicate, it is highly preferable that such contacts as may be associated therewith to control the reversing slide wire motor do not carry the entire current necessary to effect operation of the motor; but that suitable amplifying means be incorporated so that a relatively minute current under the direct control of the galvanometer may be amplified to sufficient magnitude to effect proper operation of the motor.

In my prior Patent 2,015,968 I have illustrated and described a novel potentiometer pyrometer wherein the slide wire contact is positioned by a reversing motor having opposed wound fields. Energization of one field effects operation of the motor in one direction, whereas energization of the opposed field effects operation in the opposite direction. The energization of each field is controlled by means of a suitable electron discharge device, the output circuit of which is inductively coupled therewith and the input circuit of which is controlled by the galvanometer. By means of the electron discharge devices and the inductive couplings it is possible to amplify the current directly controlled by the galvanometer many times, and thus produce accurate positioning of the reversing motor without undue burden on the galvanometer or contacts associated therewith.

My present invention relates to a modification of that disclosed in my said prior patent. In accordance with the instant invention I employ a reversing induction motor having a continuously energized A. C. field winding and opposed shading pole windings. As known, short circuiting of one pole winding of such a motor produces rotation of the motor in one direction, and short circuiting of the opposed pole winding produces rotation in opposite direction. I have found that I may effectively short circuit the pole windings of such a motor by connecting in the circuit of each winding the primary of a step-up transformer, and selectively short circuiting the secondaries of the transformers in accordance with the direction of rotation desired. The short circuiting of either secondary will sufficiently reduce the impedance of the primary that the pole winding connected in circuit therewith will be effectively short circuited. In one type of opposed shading pole motor I have employed, 22 volts exist across the pole windings when open circuited. This voltage is stepped up by means of a transformer so that there is approximately 375 volts across the secondary. Upon short circuiting the secondary of the transformer the impedance of the primary is decreased so that approximately 5 volts exist across the pole winding.

Further, in accordance with the present invention the secondaries of the transformers are connected in the output circuits of suitable electron discharge devices, the input or grid circuits of which are controlled by the galvanometer. Under normal conditions, that is when the galvanometer needle is in neutral position, the grids of the electron discharge devices may be maintained sufficiently negative so that the devices are non-conducting. Deflection of the galvanometer needle in one direction however causes the grid of a selected one of said devices to become less negative, thereby rendering the connected electron discharge device conducting, and causing the energization of the associated pole winding of the induction motor. Opposite deflection of the galvanometer needle causes energization of the opposed pole winding through similar means.

Such in general is the nature of the apparatus which I herein disclose. For a more complete understanding of my invention, and for an appreciation of the details of operation and construction, reference should be made to the description to follow and to the drawings in which.

Figure 1:
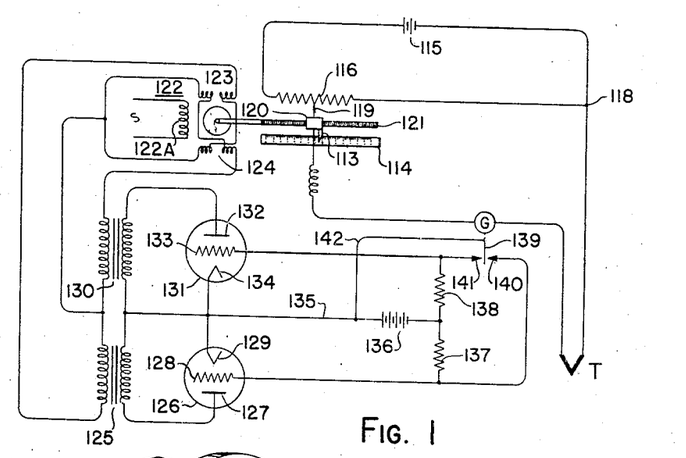
Fig. 1 illustrates schematically a basic circuit arrangement embodying my invention.

Referring to Fig. 1, I therein illustrate my invention arranged to position an indicator 113 relative to a scale 114 to exhibit the temperature to which a thermocouple T is sensitive. The thermocouple T is connected to a conventional potentiometer circuit comprising a source of potential 115 and a slide wire resistance 116 at junction 118 and contact 119. The contact 119 is positioned along the slide wire resistance 116 and the indicator 113 is moved relative to the scale 114 by a nut 120 threaded to a screw 121 rotated by an induction motor 122 having opposed wound shading poles 123, 124 and a continuously energized alternating current field winding 122A. If both pole windings 123 and 124 are open circuited, then the motor 122 remains stationary. Likewise if both pole windings 123, 124 are simultaneously energized, the motor remains stationary. If the winding 123 is short circuited, then the motor will rotate in one direction, and if the winding 124 is short circuited, the motor will rotate in opposite direction.

Connected in circuit with the winding 123 is the primary of a transformer 125, the secondary of which is connected in the output circuit of an electron discharge device 126 having an anode 127, a grid 128 and a cathode 129. The winding 124 is similarly connected in circuit with the primary of a transformer 130, the secondary of which is connected in the output circuit of an electron discharge device 131 having an anode 132, a grid 133 and a cathode 134. The cathodes 129 and 134 are connected to a common conductor 135 and may, if desired, be provided with a heating element to maintain them at a desired working temperature as well known.

When the electron discharge devices 126 and 131 are non-conducting, the impedance of the primaries of the transformers 125, 130 is sufficient that the windings 123, 124 are substantially open circuited, and the motor 122 is not urged to rotation. With the electron discharge device 126 rendered conducting, by virtue of the current induced in the secondary, the impedance of the primary of the transformer 125 is reduced sufficiently so that the winding 123 becomes substantially short circuited and the motor 122 rotates to move the nut 120 in desired direction. Conversely, when the electron discharge device 131 is short circuited, the winding 124 is substantially short circuited, moving the nut 120 in opposite direction. I have found, for example, that approximately 25 volts exist across the windings 123, 124 when open circuited. By employing an approximately 15 to 1 transformer I am able, upon rendering the electron discharge devices 126, 131 conducting, to sufficiently reduce the impedance of the primaries of the transformers so that approximately 5 volts exist across the windings 123, 124.

The grids 128, 133 are shown connected to the common conductor 135 through a source of potential 136 and resistances 137, 138 respectively. The source of potential 136 may be considered as a conventional showing of any grid bias arrangement so that normally the grids 128, 133 are negative with respect to their cathodes 129, 134 and the electron discharge devices 126, 131 non-conducting.

Connected in circuit with the thermocouple T is a galvanometer G having a movable member 139, which upon displacement from the neutral position in one direction engages a contact 140, and upon displacement in the opposite direction engages a contact 141. A conductor 142 connects the movable member 139 with the conductor 135 between the source of potential 136 and the cathodes 129, 134. When the movable member 139 engages the contact 141 the source of potential 136 and resistance 138 is shunted out, the grid 133 being rendered less negative and a potential equal to that of the cathode 134 impressed thereon. With the grid 133 at the same potential as the cathode 134 the device 131 is rendered conducting during the half cycle of the alternating current in the output circuit when the plate 132 is positive with respect to the cathode 134. During the half cycle, when the cathode 134 is positive with respect to the plate 132, the device 131 is non-conducting regardless of the potential of the grid 133.

While the device 131 is conducting the secondary winding of the transformer 130 is short circuited, thereby reducing the impedance of the primary winding sufficiently so that the winding 124 of the motor 122 is effectively short circuited, effecting rotation of motor 122 in desired sense. Displacement of the movable member 139 in opposite direction from the null or zero position so that it engages contact 140 serves to shunt out the source 136 and resistance 137, so that the grid 128 is rendered less negative causing effective short circuiting of the winding 123, and causing the motor 122 to operate in opposite direction.

In operation, assuming that the potential drop between the junction 118 and contact 119 through the slide wire resistance 116 is equal to, but opposed to that generated by the thermocouple T, the movable member 139 of the galvanometer G will be in the mid or neutral position. Upon a change in temperature of the thermocouple T, for example an increase, the movable member 139 of the galvanometer G will be displaced from the neutral position and engage contact 141. The electron discharge device 131 will be rendered conducting, winding 124 effectively short circuited and motor 122 will rotate in a direction to move the contact 119 along the slide wire resistance 116 until the potential drop between the junction 118 and contact 119 is again equal to that generated by the thermocouple T when the movable member 139 will again be restored to the neutral position, disengaging the contact 141 and rendering the electron discharge device 131 non-conducting.

Conversely, assuming a decrease in temperature of the thermocouple T, the movable member 139 will be displaced from the neutral position to engage contact 140 rendering the electron discharge device 126 conducting, which will serve to substantially short circuit the winding 123 so that the motor 122 will rotate in a direction to decrease the potential drop between the junction 118 and contact 119 until the movable member 139 is again restored to the neutral position.

As taught in my parent application Serial No. 77,488, the source 136 may comprise a source of alternating current potential suitably phased with respect to the alternating current in the output circuits of the devices 126 and 131, so that normally the grids 128, 133 are negative during the half cycle when the anodes 127, 132 are positive with respect to the cathodes 129, 134, thereby maintaining the devices 126, 131 non-conducting. With such an arrangement during the remaining half cycle the grids 128, 133 will be positive with respect to the cathodes 129, 134. However, the devices will remain non-conducting as during this half cycle the plates 127, 132 will be negative with respect to the cathodes 129, 134. It will be evident therefore that during this half cycle it is immaterial what relative voltage the grids 128, 133 assume with respect to the cathodes 129, 134.

Further, as well known, improved operation of a potentiometric system may be obtained by effecting periodic operation of the reversing means moving the contact relative to the slide wire; and further by relatively moving the contact and slide wire periodically by amounts corresponding to the deflection of the galvanometer needle from the mid or neutral position. In my prior Patent 2,015,968 I disclose apparatus whereby the input circuits of suitable electron discharge devices, such as illustrated at 126, 131 may be so controlled in correspondence with the deflections of a galvanometer needle that the output circuits thereof will be periodically rendered conducting for time increments corresponding to the deflection of the galvanometer needle from the mid or neutral position.

Figure 2:
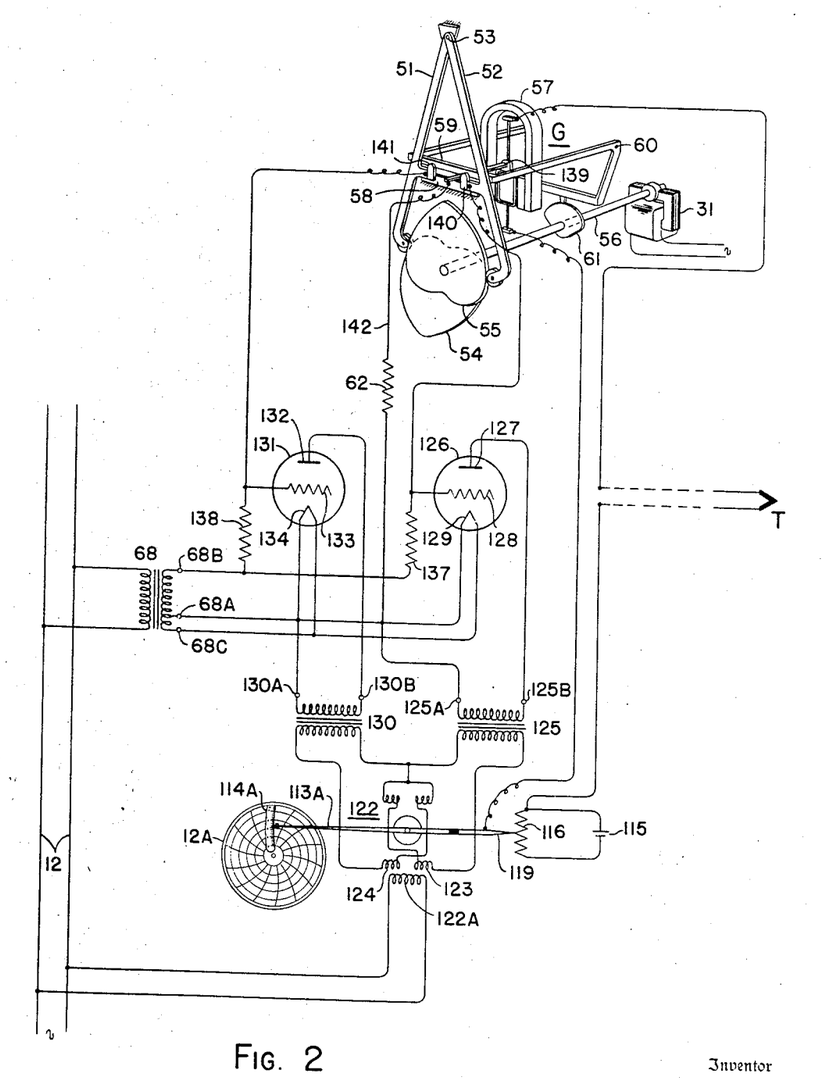
Fig. 2 diagrammatically illustrates a circuit arrangement substantially the same as that illustrated in Fig. 1 together with some constructional features.

In Fig. 2 I have illustrated the circuit arrangement disclosed in Fig. 1 but incorporating an alternating current grid bias. Further in Fig. 2 I have illustrated the mechanism disclosed in my prior Patent 2,015,968 whereby I secure periodic energization of the input circuits of the electron discharge devices 126, 131 time quantitatively in correspondence with the amount of deflection of the galvanometer needle 139 from the mid or neutral position. By virtue of the fact that short circuiting of the winding 123 or 124 results in operation of the motor 122 at substantially constant speed it follows that if the input circuits are energized time quantitatively in correspondence with the amount of deflection of the galvanometer needle 139 from the neutral position, the desideratum will be secured of having the slide wire contact 119 periodically adjusted in amount corresponding to the amount of deflection of the galvanometer needle.

Referring to Fig. 2 I will first describe the circuit arrangement, whereby the grids 128, 133 are provided with alternating current so phased that normally, during the half cycle when the plates 127, 132 are positive the grids are negative; and during the half cycle that the plates are negative the grids are positive with respect to the cathodes 129, 134. The potential normally effective on grids 128, 133 is obtained from an alternating current source 12 through a transformer 68 and the resistances 137, 138. The cathodes 129, 134 are connected to a terminal 68A and the grids 128, 133 to an opposite terminal 68B of the secondary of the transformer 68. Normally therefore during one half cycle the grids 128, 133 will be positive with respect to the cathodes 129, 134 and during the remaining half cycle negative with respect thereto.

During the half cycle that the grids 128, 133 are positive with respect to the cathodes 129, 134 I cause the plates 127, 132 to be negative with respect to the cathodes 129, 134 by properly phasing the A. C. field winding 122A of the motor 122 and transformers 125 and 130. Thus notwithstanding that the grids 128, 133 are positive the electron discharge devices 126, 131 will be non-conducting. As shown, terminals 125A, 130A of the secondaries of transformers 125, 130 are maintained at the potential of cathodes 129, 134. The phase of the field winding 122A and of the secondaries of the transformers 125, 130 is so arranged that during the half cycle when the grids are positive relative to the cathodes the terminals 125B, 130B of the secondaries of transformers 126, 131 connected to the plates 127, 132 are negative and no current will pass through the electron discharge devices 126, 131.

In order to render one or the other of the devices 126, 131 conducting, selectively in correspondence with the deflections of the galvanometer needle 139 from the mid or neutral position, I render the grids less negative during the half cycle when the plates are positive with respect to the cathodes. As shown, the galvanometer needle 139 is connected to the cathodes 129, 134 through the conductor 142 in which is a suitable resistance 62. Upon the deflection of the galvanometer to the right, as shown in Fig. 2, the contact 140 is engaged and the resistance 137 bypassed, thus impressing upon the grid 128 a potential substantially equal to that of the cathode 129. The device 126 will thus be rendered conducting and effect operation of the motor 122 in predetermined direction as heretofore described. Deflection of the galvanometer needle 139 to the left and resulting engagement of the contact 141 renders the device 131 conducting, resulting in operation of motor 122 in opposite direction.

To effect periodic operation of the motor 122 time quantitatively in correspondence with the deflection of the galvanometer needle 139 from the mid or neutral position I show in Fig. 2 the galvanometer contacting mechanism illustrated and described in my prior Patent 2,015,968. Members illustrated as scissors bars 51 and 52 both pivoted at 53 are periodically moved toward and away from each other by the agency of similar but oppositely positioned cams 54, 55 rigidly attached to a shaft 56 rotated at constant speed by the continuously operated motor 31. The scissors bars 51, 52 are provided at their lowermost ends with rollers, the one riding the surface of the cam 54 and the other the surface of the cam 55. The scissors bars further carry respectively the contacts 141, 139 insulated therefrom and from each other.

The galvanometer G as schematically illustrated in Fig. 1 is shown in Fig. 2 as being of the suspended type and properly located relative to a permanent magnet 57. Normally the needle 139 of the galvanometer is free to deflect in accordance with the difference of potentials generated by the source to which the galvanometer is connected, and that portion of the potentiometer circuit spanned. Periodically, however, the needle 139 is clamped between a stationary portion 58 and a movable bar 59 which is pivoted at a point 60. The pivoted portion carrying the movable bar 59 is reciprocated or angularly moved relative to the pivot 60 by means of a constantly revolving cam 61 secured to the shaft 56. Thus periodically upon each revolution of the cam 61 the needle 139 will be clamped lightly between the stationary member 58 and the movable reciprocating bar 59 and for a portion of each revolution of the cam 61.

Immediately after the needle 139 has been so clamped, the position of the cams 54, 55 relative to the cam 61 is such that the scissors arms 51, 62 move toward each other. When, as shown, the galvanometer needle 139 is in the mid-position, indicating a balance between the two potentials, the scissors arms 51, 52 will follow the complete periphery of the cams 54, 55 and neither the contacts 49, 50 will engage the needle 139. However, if the needle is deflected through action of the galvanometer G either to the right or to the left, then the adjacent scissors arms will follow the periphery of the associated cam until the contact carried by the scissors arm reaches the needle. Further motion of the scissors arm toward the other will then be prevented by the galvanometer needle, and the engaged contact will remain in engagement with the needle until the scissors arm is again picked up by the associated cam and moved away. At a predetermined definite point in the outward travel of the scissors arms the galvanometer needle 139 will be released from clamping engagement and be free to deflect either further away or return toward the predetermined neutral position, and until it is again clamped as a scissors arms travel toward each other on the next cam cycle of revolution.

It is evident that by proper shaping of the cams 54, 55 the length of time the scissors arms are in contact with the galvanometer needle 139 may be made directly proportional to the amount of deviation of the needle from the mid position, which in turn is proportional to the difference of the opposed potentials. If desired, one of the cams, for example, 54, may be made of a different shape than the other cam, for example 55, whereby the length of contact for a given deflection of the galvanometer needle in one direction may be made different from that for the same amount of deflection of the galvanometer needle in the opposite direction. It is further evident that the cams 54, 55 may be made of any desired shape so that the length of engagement between the contacts carried by the scissors arms and the galvanometer needle may bear any desired functional relation to the amount of deviation from the neutral or mid-position of the galvanometer needle.

In each cycle of operation the galvanometer needle 139 will engage either the contact 140 or 141 in accordance with the direction of the deflection of the needle from the mid or neutral position, and such engagement will be time quantitatively in accordance with the amount of deflection of the needle from the neutral position. Such engagement will render a selected one of the devices 126, 131 conducting and thus short circuit the opposed pole winding 123 or 124 to effect rotation of the motor 122. Such rotation will be in proper direction to rebalance the potentiometer, that is to move the contact 119 along the slide wire 116 so that the potential determined by that portion of the slide wire spanned is maintained equal to that generated by the thermocouple T.

In Figs. 1 and 2 I have shown the motor 122 and associated apparatus diagrammatically. In Fig. 1 the motor is shown as positioning the index 113 along a scale 114. In Fig. 2 I have illustrated the motor 122 as positioning an index 113A adapted to indicate the temperature in cooperation with a suitably graduated scale 114A and to record the same in cooperation with a suitably graduated chart 12A which may be rotated at desired speed by any suitable clock means (not shown).

Figure 3:
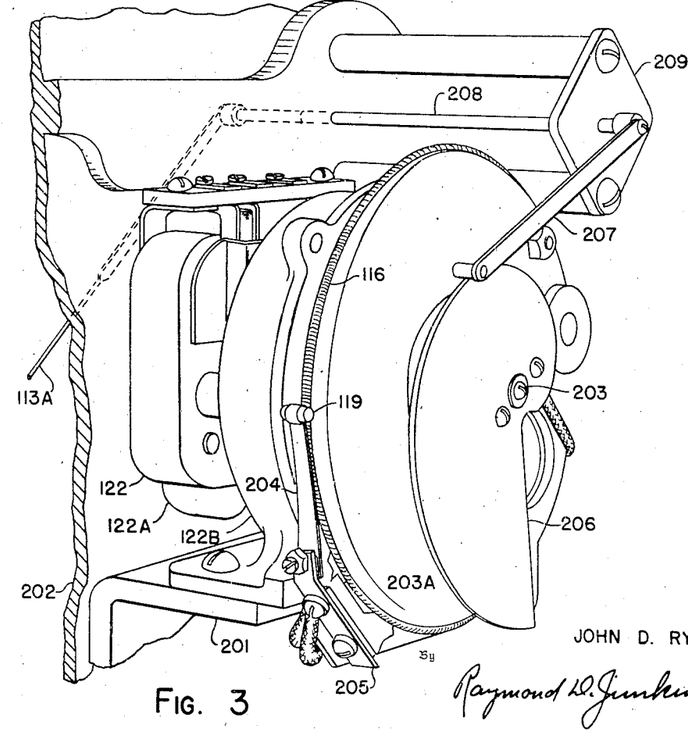
Fig. 3 is a detailed view of an induction motor having opposed shading pole windings and associated apparatus diagrammatically illustrated in Fig. 2.

In Fig. 3 I have shown in perspective a detailed view in more commercial form of the motor 122 and associated apparatus. The motor 122 is mounted on a base 201 secured to the rear of a panel 202. Secured to the shaft 203 driven by the motor 122 is a flat disc 203A carrying in its outer periphery the slide wire 116. The contact 119 is carried in a resilient arm 204 secured to a stationary adjustable bracket 205. Rotation of the motor 122 positions the contact 119 relative to the slide wire 116 and varies the amount of the latter spanned by the thermocouple connections.

The rotor of the motor 122 rotates at relatively high speed in the order of 2000 or more revolutions per minute. As shown, the slide wire 116 is however positioned less than a complete revolution. The shaft 203 is therefore not driven directly from the rotor of the motor 122 but through an integral gear reduction unit 122B, so that the angular speed of the shaft 203 is in the order of a few RPM.

The index 113A is angularly positioned by the motor 122 through a cam 206 secured to the shaft 203, cam follower 207 and shaft 208 journaled in the panel 202 and a bearing 209. As known, a non-linear relation exists between the temperature to which a thermocouple is subjected and the emf produced thereby. The cam 206 may be given a non-linear shape corresponding to the relation existing between temperature and thermocouple emf so that the index 113A will be positioned in linear relation to the temperature rather than in linear relation to the emf generated by the thermocouple. As evident to those skilled in the art the panel 202 may be provided with suitable chart holding means on which the chart 12A as shown in Fig. 2 may be mounted. Likewise suitable means for rotating the chart may be provided.

Figure 4:
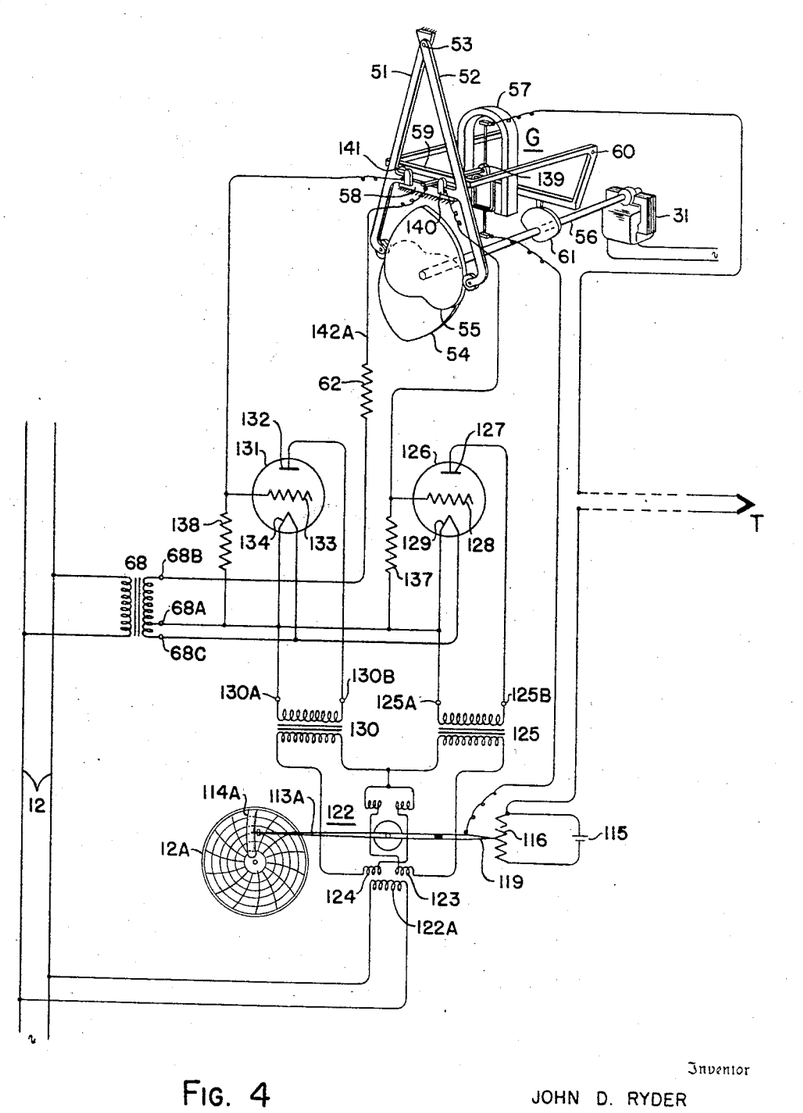
Fig. 4 illustrates a somewhat modified form of circuit arrangement over that disclosed in Figs. 1 and 2.

In Figs. 1 and 2 I have illustrated my invention wherein the electron discharge devices 126, 131 are normally non-conducting and consequently the pole windings 123, 124 are open circuited. In Fig. 4 I illustrate a modified circuit arrangement wherein the devices 126, 131 are normally conducting and the pole windings 123, 124 normally short circuited. Such concurrent energization of the pole windings 123, 124 does not produce rotation of the motor 122 however, as both windings are equally energized and act in opposition to each other. Upon engagement of the galvanometer needle 139 with the contact 140, for example, the device 126 is rendered non-conducting and the winding 123 deenergized. The motor 122 will then rotate under the action of the pole winding 124 in predetermined direction. Conversely when the galvanometer needle 139 engages the contact 141 the winding 124 will be deenergized and the motor 122 will then rotate in opposite direction under the action of the pole winding 123. The arrangement shown in Fig. 4 is otherwise the same as that illustrated in Fig. 2.

Referring to Fig. 4 the devices 126, 131 are maintained normally conducting by connecting the grids 128, 133 to the cathodes 129, 134 through resistances 137 and 138 respectively. When the galvanometer needle 139 does not engage either the contact 140 or 141, during each half cycle when the anodes 127, 132 are positive with respect to the cathodes 129, 134 the electron discharge devices 126, 131 will be conducting. As heretofore described such intermittent operation of the electron discharge devices will effectively short circuit the windings 123, 124 of the motor 122.

In this embodiment, it will be noted, the galvanometer needle 139 is connected by a conductor 142A through the resistance 62 to the terminal 68B of the secondary of the transformer 68, which is opposite in phase to the terminal 68A to which cathodes 129, 134 are connected. Upon engagement of the galvanometer needle 139 with the contact 140, for example, during the half cycle when the anode 127 is positive with respect to the cathode 129 the grid 128 will be rendered sufficiently negative with respect to the cathode 129 as to render the electron discharge device 126 non-conducting. Throughout the duration of such engagement between the galvanometer needle 139 and contact 140 the pole winding 123 will be deenergized and the motor 122 rotate in predetermined direction under the action of the pole winding 124. Engagement of the galvanometer needle 139 with the contact 141 renders the electron discharge device 131 non-conducting throughout the duration of such engagement, thereby permitting the motor 122 to rotate in opposite direction under the action of the pole winding 123.

I have illustrated in Fig. 4 the same galvanometer contacting mechanism as illustrated in Fig. 2, so that the motor 122 will be periodically positioned, time quantitatively in correspondence with the amount of deflection of the galvanometer needle 139 from the neutral position.

Figure 5:
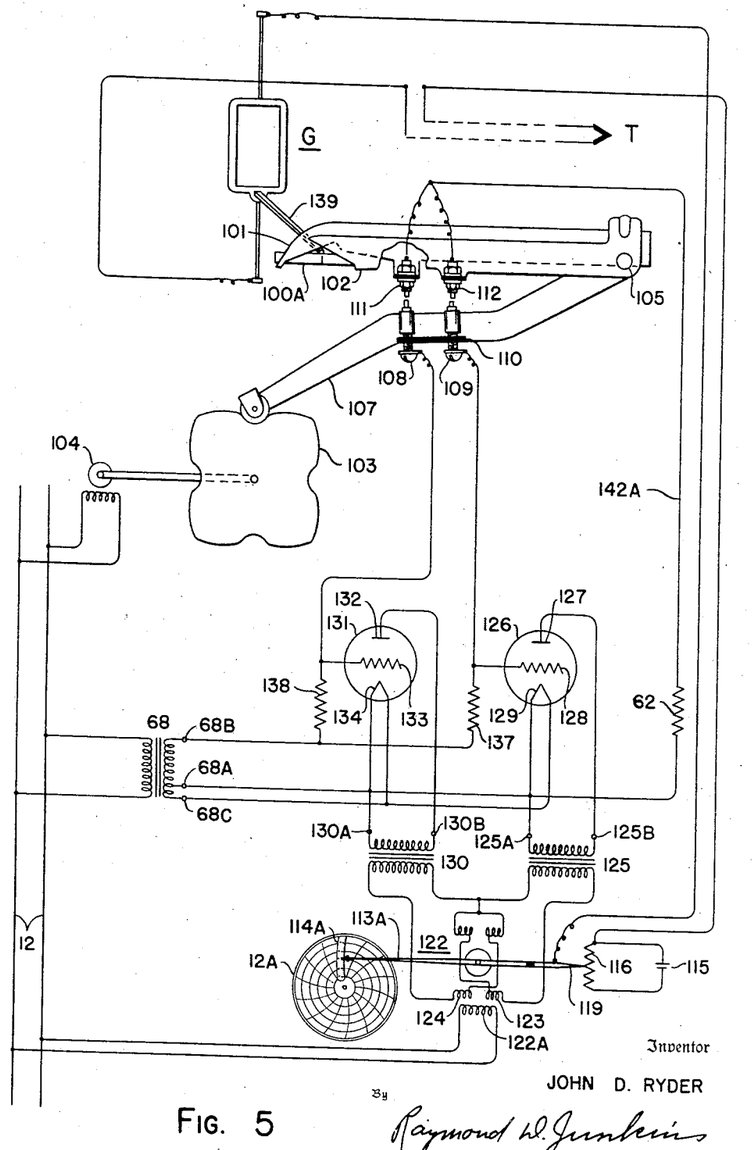
Fig. 5 illustrates a further embodiment of my invention differing in mechanical details; but employing the same circuit arrangement as shown in Figs. 1 and 2.

In Fig. 5 I show a further modified form of my invention somewhat different as to mechanical arrangement of the galvanometer contacting mechanism than the embodiments heretofore described but embodying the same basic principles. Referring to the drawings, the galvanometer needle 139 is arranged to be positioned along a stationary horizontal anvil 100A in correspondence with differences in the potential generated by the thermocouple T and that in the portion of the slide wire resistance 116 determined by the position of the contact 119. Two feelers 101 and 102 are adapted to be reciprocated between definite limits about a bearing 105 by a cam 103 continuously rotated at constant speed by a motor 104. During each reciprocation one or the other, or both of the feelers 101, 102 engage the galvanometer needle 139 and depress it against the anvil 100A when further movement of the feelers is arrested. As shown, the feelers are provided with oppositely disposed sloping contact surfaces. When the galvanometer needle is in the mid or neutral position both feelers simultaneously engage the galvanometer needle as they move downwardly under the influence of gravity, and are simultaneously disengaged from the galvanometer needle as they are positioned upwardly by the cam 103. If the galvanometer needle is deflected to the left, as viewed in the drawings, the downward course of the feeler 101 will be arrested and it will remain in engagement with the galvanometer needle for a time duration corresponding to the deflection of the galvanometer needle from the mid or neutral position. Conversely, if the galvanometer needle is deflected to the right, as viewed in the drawings, the downward course of the feeler 102 will be arrested and it will remain in engagement with the galvanometer needle for a time duration corresponding to the deflection of the galvanometer needle from the mid or neutral position.

The feelers 101, 102 are reciprocated by the cam 103 through a follower 107 pivoted about the bearing 105. The follower carries a projection 110 made of insulating material in which are threaded adjustable contacts 108 and 109. The contact 108 normally engages a contact 111 carried in an insulated forwardly extending projection on the feeler 101. The contact 109 is normally in engagement with a similar contact 112 carried by the feeler 102. While the feeler 101 is in engagement with the galvanometer needle 139 contacts 108—111 are disengaged, and while the feeler 102 is in engagement with the galvanometer needle, contacts 109—112 are disengaged. It is apparent therefore that the arrangement provides for the periodic engagement of contacts 108—111 for a time increment corresponding to the deflection of the galvanometer needle 139 to the left of the mid or neutral position, and for periodic disengagement of contacts 109—112 for a time increment corresponding to the deflection of the galvanometer needle to the right of the mid or neutral position.

By adjustment of the contacts 108, 109 engagement with contacts 111, 112 may be maintained throughout the cyclic course of the follower 107 when the galvanometer needle 139 is in the neutral position. However, I usually find it preferable to have both contacts 108—111 and 109—112 disengage for a small increment of time when the galvanometer needle 139 is in the neutral position. In this manner I may provide for a more sensitive control of the motor 122, for upon the slightest deflection of the galvanometer needle from the neutral position a difference in time duration of disengagement of contacts 108—111 and 109—112 will be effected. If the contacts 108—111 and 109—112 were permitted to remain in engagement throughout the cyclic course of the follower 107 when the galvanometer needle is in the neutral position unless a high degree of care was exercised in adjustment of the apparatus it would be possible for the galvanometer needle 139 to deflect slightly to the right or to the left from the neutral position and still have the contacts 108—111 and 110—112 remain in engagement.

In the modification of my invention shown in Fig. 5 the contacts 111—112 are connected by conductor 142A through resistance 62 to the terminal 68A. The electron discharge devices 126, 131 are therefore maintained normally conducting. When contact 109 disengages contact 112 the electron discharge device 126 is rendered non-conducting, as the grid 128 is then connected through resistance 137 to the terminal 68B of the secondary of transformer 68. Similarly when contact 108 disengages contact 111 the electron discharge device 131 is rendered non-conducting. As described with reference to the circuit arrangement disclosed in Fig. 4 when either the electron discharge device 126 or 131 is rendered non-conducting the motor 122 will rotate as then only one pole winding will be effectively short circuited. In general, it will therefore be seen that normally the motor 122 will remain stationary as both pole windings 123, 124 will be short circuited. During each reciprocation of the follower 107 however, when the galvanometer needle 139 is in the neutral position, both pole windings 123, 124 will be open circuited for a small increment of time. Deflection of the galvanometer needle 139 to the left as viewed in the drawings will cause the contact 111 to disengage the contact 108 for a longer duration and the motor 122 will therefore rotate in a given direction. Upon deflection of the galvanometer needle 139 to the right the motor will operate in the opposite direction due to the disengagement of contact 109 from contact 112.

For the sake of simplicity and clarity in Fig. 5 I have omitted the usual permanent magnets associated with the galvanometer G. It will be evident to those skilled in the art however that the galvanometer G may be provided with such magnets and other accessories as are usual, so that the needle 139 will deflect from the mid or neutral position in accordance with the energization of its winding.

Figure 6:
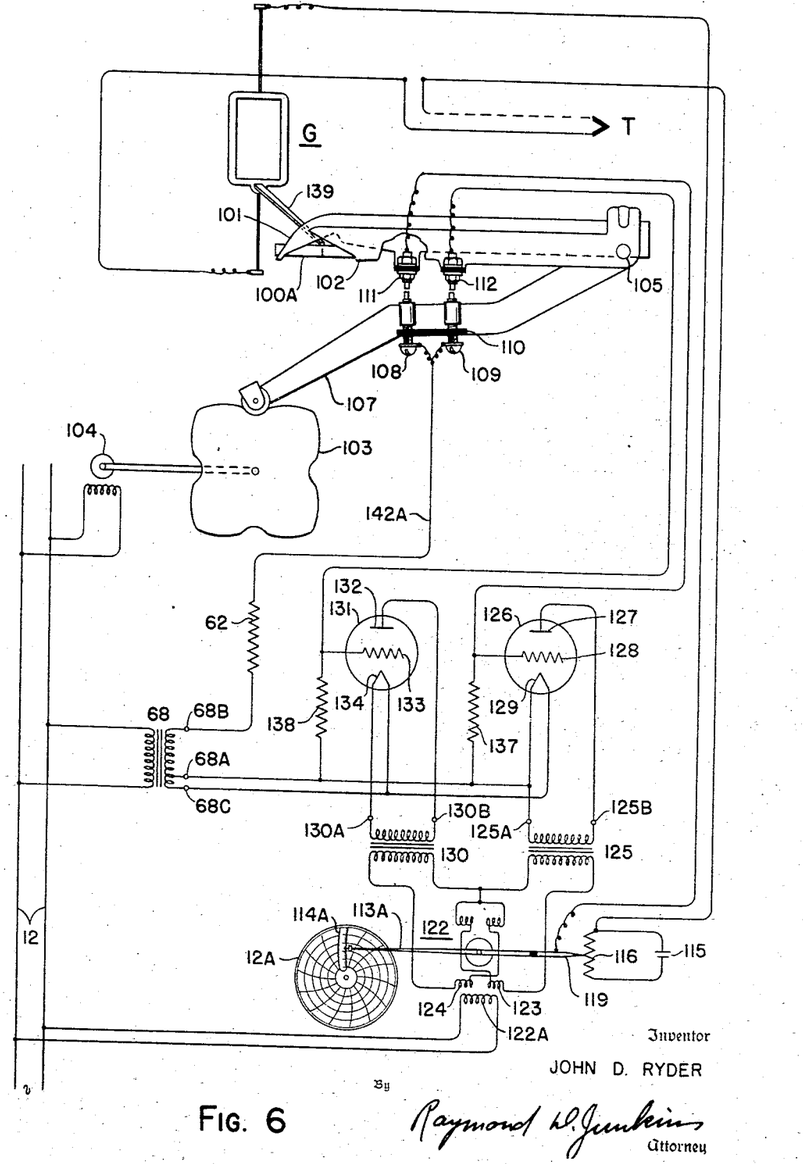
Fig. 6 illustrates a further embodiment of my invention employing the mechanical construction illustrated in Fig. 5 and the circuit arrangement shown in Fig. 4.

In Fig. 6 I illustrate a further modification of my invention wherein I employ a galvanometer contact mechanism as illustrated in Fig. 5, but maintain the electron discharge devices 126, 131 normally non-conducting. It will be observed that the contacts 108, 109 are connected by conductor 142A through resistance 62 to the terminal 68B of the secondary of the transformer 68. When contacts 108—111 and 109—112 are engaged during the half cycle when the anodes 127, 132 are positive with respect to the cathodes 129, 134 the grids 128, 133 will be negative with respect to the cathodes 129, 134. Upon disengagement of contact 108 from contact 111 the electron discharge device 126 will be rendered conducting, for the grid 128 will then be maintained at the potential of the cathode 129. Similarly, when contact 109 disengages contact 112 the electron discharge 131 will be rendered conducting, as then the grid 133 will be maintained at the potential of the cathode 134. It will be observed that the circuit arrangement illustrated in Fig. 6 and operation of motor 122 is substantially the same as that illustrated and described with reference to the embodiment of my invention shown in Figs. 1 and 2.

It will be understood that by describing and illustrating certain preferred embodiments of my invention I am not to be limited thereby except as to the appended claims in view of the prior art.

What I claim as new, and desire to secure by Letters Patent of the United States, is:

1. In a potentiometer pyrometer, in combination, a thermocouple producing an E. M. F. varying in non-linear relation to temperature, an adjustable slide wire resistance for balancing the potential generated by said thermocouple, a cam adjusted with said slide wire resistance having a shape corresponding to the non-linear relation between the thermocouple E. M. F. and temperature, and indicating means positioned by said cam whereby said indicating means is positioned in linear relation to the temperature producing said thermocouple E. M. F.

2. In a potentiometer pyrometer, in combination, a thermocouple producing an E. M. F. varying in non-linear relation to temperature, a slide wire resistance, a voltage source for producing a potential drop through said slide wire resistance, a contact engaging said slide wire connected to said thermocouple, means for adjusting said contact relative to said slide wire to maintain the potential drop through that portion of the slide wire determined by the position of said contact equal to the E. M. F. produced by said thermocouple, a cam positioned by said last-named means having a shape corresponding to the non-linear relation between thermocouple E. M. F. and temperature, and exhibiting means positioned by said cam.

3. In a potentiometer pyrometer, in combination, a thermocouple producing an E. M. F. varying with temperature, a slide wire resistance, a voltage source for producing a potential drop through said slide wire, a contact engaging said slide wire connected to said thermocouple, means for adjusting said contact relative to said slide wire to maintain the potential drop through that portion of the slide wire determined by the position of said contact equal to the E. M. F. produced by said thermocouple, a cam positioned by said last-named means having a shape corresponding to the relation between thermocouple E. M. F. and temperature, and exhibiting means positioned by said cam.

4. In a self-balancing potentiometer system, a motor having a rotor operable in opposite directions, a circular disk mounted on said rotor having a slide wire resistance secured to its periphery, a cam mounted on said rotor, and exhibiting means positioned by said cam so that equal increments of motion of said exhibiting means correspond to unequal angular increments of motion of said slide wire.

5. In a self-balancing potentiometer having a slide wire and a contact movable relative thereto, a source of variable E. M. F. having a non-linear function connected to said contact, reversible means for positioning said contact relative to said slide wire to balance the potentiometer in response to changes in said E. M. F., a non-linear cam for extracting the non-linear function of the variable E. M. F. positioned by said last-named means, and exhibiting means positioned by said cam.

6. In a circular chart type of self-balancing potentiometer, a circular chart having minimum and maximum graduations, an index movable relative to said chart, a thermocouple producing an E. M. F. varying with temperature, a cam for positioning said index relative to said chart, means responsive to said E. M. F. angularly positioning said cam in correspondence with changes in said E. M. F.; said cam having a rise such that a predetermined selected change in temperature will cause said index to be positioned from said minimum graduation to said maximum graduation.

7. In a self-balancing potentiometer pyrometer, a scale having substantially uniform graduations, an index movable relative to said scale and exhibiting temperature, a cam for positioning said index relative to said scale, a thermocouple for producing an E. M. F. varying in non-linear relation to temperature, means responsive to said E. M. F. for angularly positioning said cam in linear relation to changes in E. M. F.; said cam having a non-uniform rise so that said index is positioned in linear relation to changes in temperature.

8. In a circular chart type of self-balancing potentiometer having a thermo-couple with a non-linear output voltage characteristic, a balancing source of E. M. F., a slide wire resistance and a contact movable relative thereto to balance the thermo-couple output and said E. M. F. and a reversible motor for relatively positioning said slide wire and contact to effect said balance, the combination with a cam positioned by said reversible motor, and an index positioned by said cam so that it is moved in such relation to changes in the relative positions of said slide wire and contact that the index travels linearly to indicate the thermo-couple output.

JOHN D. RYDER.